United States Patent
Krishnan et al.

(10) Patent No.: US 8,399,849 B1
(45) Date of Patent: Mar. 19, 2013

(54) FAST NEUTRON DETECTOR

(75) Inventors: Mahadevan Krishnan, San Leandro, CA (US); Mahmud Vahdat Roshan, Singapore (SG); Paul Choon Keat Lee, Singapore (SG); Rajdeep Singh Rawat, Singapore (SG); Stuart Victor Springham, Jurong West (SG)

(73) Assignee: Redpine Signals, Inc, San Jose, CA (US)

( * ) Notice: Subject to any disclaimer, the term of this patent is extended or adjusted under 35 U.S.C. 154(b) by 665 days.

(21) Appl. No.: 12/538,138

(22) Filed: Aug. 8, 2009

(51) Int. Cl.
*G01T 5/00* (2006.01)
*G01T 1/00* (2006.01)

(52) U.S. Cl. ............... 250/390.01; 250/370.05; 250/253; 376/153; 376/158; 376/159

(58) Field of Classification Search ............... 250/361 R, 250/390.11, 370.05, 390.01, 390.03, 269.4, 250/367, 328, 269.6, 269.8, 253, 390.04; 252/30.16, 301.17, 301.4 R, 600; 376/158
See application file for complete search history.

(56) References Cited

U.S. PATENT DOCUMENTS

| | | | |
|---|---|---|---|
| 4,271,361 A | 6/1981 | Jacobs | |
| 4,647,781 A | 3/1987 | Takagi et al. | |
| 4,747,973 A * | 5/1988 | Cusano et al. | 252/301.4 R |
| 4,814,623 A | 3/1989 | Robertson et al. | |
| 4,958,080 A | 9/1990 | Melcher | |
| 5,264,154 A | 11/1993 | Akiyama et al. | |
| 5,483,070 A * | 1/1996 | Valenta | 250/366 |
| 5,521,387 A | 5/1996 | Riedner et al. | |
| 5,734,166 A | 3/1998 | Czirr | |
| 5,866,907 A | 2/1999 | Drukier et al. | |
| 6,323,489 B1 | 11/2001 | McClellan | |
| 6,495,837 B2 * | 12/2002 | Odom et al. | 250/390.11 |
| 6,603,122 B2 * | 8/2003 | Taleyarkhan | 250/358.1 |
| 6,624,420 B1 | 9/2003 | Chai et al. | |
| 6,689,293 B2 | 2/2004 | McClellan et al. | |
| 7,002,159 B2 | 2/2006 | Lacy | |
| 7,145,149 B2 | 12/2006 | Cooke et al. | |
| 7,297,957 B1 | 11/2007 | Vickers et al. | |
| 7,525,094 B2 | 4/2009 | Cooke et al. | |
| 2006/0138345 A1 * | 6/2006 | Fehrenbacher | 250/482.1 |
| 2007/0272874 A1 * | 11/2007 | Grodzins | 250/390.11 |
| 2009/0272910 A1 * | 11/2009 | Grynyov et al. | 250/390.11 |
| 2011/0198488 A1 * | 8/2011 | Stoller et al. | 250/258 |

OTHER PUBLICATIONS

Eichin et al., "Validation experiments of gamma activities of yttrium and lead irradiated in fusion peak neutron field," published Jun. 9, 2004, Retrieved from internet [Feb. 22, 2012]; Retrieved from url <http://www.ccfe.ac.uk/easy2005/prague/eichin.pdf>.*

* cited by examiner

*Primary Examiner* — David Porta
*Assistant Examiner* — Yara Green
(74) *Attorney, Agent, or Firm* — Jay A. Chesavage; File-EE-Patents.com

(57) ABSTRACT

An activation detector for fast-neutrons has a yttrium target exposed to a neutron source. Fast-neutrons which have energy in excess of 1 MeV (above a threshold energy level) generate gamma rays from a nuclear reaction with the yttrium, the gamma rays having an energy level of 908.96 keV, and the resultant gamma rays are coupled to a scintillator which generates an optical response, the optical response of the scintillator is coupled to a photomultiplier tube which generates an electrical response. The number of counts from the photomultiplier tube provides an accurate indication of the fast-neutron flux, and the detector is exclusively sensitive to fast-neutrons with an energy level over 1 MeV, thereby providing a fast-neutron detector which does not require calibration or the setting of a threshold.

16 Claims, 4 Drawing Sheets

Fast Neutron Detector

Fast Neutron Detector
Integrated Yttrium slab

Fast Neutron Detector
Yttrium Cup target with Scintillator below

Fast Neutron Detector
Yttrium Cup target with Scintillator-target below

Gamma Ray Energy Spectrum from collision of fast neutron with Yttrium target

| | 610 $E_{level}$ (kev) | 612 $J_n$ | 614 $T_{1/2}$ | $E_v$ 616 (kev) | 618 $L_v$ | 620 $v$ mult | 622 Final Level | |
|---|---|---|---|---|---|---|---|---|
| | 0.0 | 1/2− | STABLE | | | | | |
| 602 | 908.97 | 9/2+ | 15.663s | 908.96 | 100 | (M4(+E5)) | 0.0 | 1/2− |
| 604 | 1507.41 | 3/2− | 23.9fs | 1507.42 | 100 | M1+E2 | 0.0 | 1/2− |
| 606 | 1744.74 | 5/2− | .64 ps | 1744.7 | 100 | E2 | 0.0 | 1/2− |
| 608 | 2222.43 | 5/2+ | .97ps | 715.2　1313.2 | 46.0　100.0 | E1　E2 | 1507.41　908.97 | 3/2−　9/2+ | cross section for reaction $^{89}Y(n,n')^{89m}Y$ vs neutron energy

Fast Neutron Profiling for a Reactor Core

FAST NEUTRON DETECTOR

FIELD OF THE INVENTION

The present invention relates to a fast-neutron detector. In particular, the invention relates to an activation detector which generates an electrical photomultiplier response from an incoming neutron which is above a particular threshold energy level, where the incoming neutron generates a secondary particle which is detected by a scintillator coupled to the photomultiplier.

BACKGROUND OF THE INVENTION

Measurements of neutron flux are essential in many present-day nuclear technologies. Neutron source devices are typically either pulsed sources or continuous sources. Among the pulsed neutron sources are devices such as the plasma focus, z-pinch, inertial confinement (laser driven) fusion, and neutron spallation sources. Neutron spallation sources provide intense neutron beams for materials analysis, useful for the characterization of a material using neutron diffraction. Continuous sources of neutrons include devices which use magnetic confinement fusion, commercial nuclear fission power reactors, and neutron generators for use in well logging in oil and gas exploration. Among the applications of neutron beam sources are explosives detection, such as for use with passenger luggage, and arms control tracking, such as monitoring of nuclear material where the detection of neutron radiation is an unequivocal signature of the presence of transuranic elements associated with nuclear power-generated plutonium and enriched uranium, including weapons grade plutonium.

OBJECTS OF THE INVENTION

A first object of the invention is a fast-neutron detector which has a high purity metallic yttrium target for the generation of gamma rays by neutrons above a particular energy level, the gamma rays are subsequently absorbed by a scintillator which is optically coupled to a photo detector such as a photomultiplier tube.

A second object of the invention is a fast-neutron detector comprising an optically transparent ceramic scintillator containing yttrium. One method of forming such a ceramic scintillator is to sinter yttria ($Y_2O_3$) powder with another scintillating powder, such as BGO or LYSO, which is a good absorber of gamma rays. The transparent ceramic scintillator is coupled to a photomultiplier tube for generating an electrical measurement.

A third object of the invention is a detector having a yttrium cup surrounding a scintillator which is coupled to a photomultiplier tube, the scintillator optionally containing yttrium and a scintillator responsive to gamma rays.

A fourth object of the invention is a process for measurement of neutron density having a first step of immersing a yttrium target into a region having a neutron flux to be measured, a second step of removing the yttrium target and counting the number of gamma rays per unit time using a scintillator coupled to a photomultiplier, and a third step of computing neutron density from the gamma ray count, whereby the neutron density is derived from the number of gamma ray counts from the photomultiplier.

Yttrium as a target material has the property of generating a mono-energetic secondary radiation in the form of a 908.960 keV gamma ray. The mono-energetic nature of the secondary radiation enables the detector to measure absolute neutron flux without reference to an external standard. As an additional advantage, the 908.960 keV gamma ray is not accompanied by other particles such as alpha or beta particles. This has particular detector advantages, as prior art detectors are unable to discern the detection of causal particles associated with particular events from background radiation, and often require a coincidence detector to detect the simultaneous emission of a variety of particle types to distinguish a causal radiation event from random background noise and background particle emission.

SUMMARY OF THE INVENTION

A detector for the absolute measurement of flux of fast-neutrons employs the activation of yttrium using incoming fast-neutrons, where fast-neutrons are defined as neutrons having an energy level above 1.0 MeV. Yttrium nuclei are excited by inelastic scattering of the incoming neutrons from their ground state to the first nuclear excited state, a long-lived (meta-stable) state, $^{89m}Y$, with a half-life of approximately 15.7 seconds, which state de-excites with the emission of a single 908.960 keV gamma-ray. The emitted gamma-rays are detected by a suitable scintillation detector such as BGO or LYSO crystal coupled to a photomultiplier tube. The gamma-rays emitted are mono-energetic (i.e. exactly 908.960 keV), which enables the absolute neutron flux to be determined. It is advantageous that natural yttrium is isotopically 100% $^{89}Y$. One of the distinguishing features of the invention is that it does not have to be calibrated against a neutron source of known intensity, whereas the prior art detectors such as U.S. Pat. No. 4,271,361 by Jacobs (using Arsenic as the target material), U.S. Pat. No. 7,002,159 by Lacy (using Boron as the target material), and 7,297,957 by Vickers et al require calibration, since they respond to slow neutrons as well as to fast neutrons. The present yttrium activation detector is well suited for measuring the flux from pulsed neutron sources, where the pulse duration can be of the order of 1 second or shorter. For a short duration pulsed neutron source, the neutron collisions with the yttrium target material cause the formation of $^{89m}Y$ with a half life of 15.7 seconds, during which radioactive interval the scintillating detector is converting gamma rays emitted by the yttrium to a photonic response captured by the photomultiplier tube. Since the present invention is an activation detector, there is essentially no lower limit for the neutron pulse duration.

DETAILED DESCRIPTION OF THE INVENTION

Figure 1:
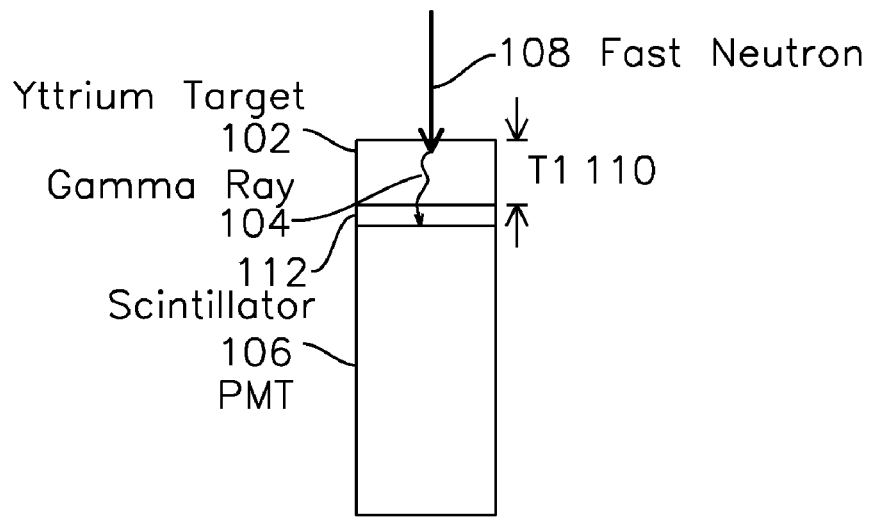
FIG. 1 is a section view diagram for a fast-neutron detector according to an embodiment of the present invention.

Neutrons, being uncharged particles, can travel through substantial thicknesses of matter without causing ionization, and are therefore difficult to detect directly. In practice, some other influence of a neutron transit must be detected in order to register the passage of the neutron. One of the indirect methods is known as an activation detector, which detects the result of a neutron scattering or nuclear reaction, rather than the neutron itself. Phosphors are currently used in many important devices such as fluorescent lamps, RGB (red, green, blue) CRT screens, lasers, and crystal scintillators for radiation detectors, radiographic imaging and nuclear spectroscopy. One of the most important properties of any phosphor is its brightness, i.e. its quantum efficiency, which is the ratio of the number of photons emitted by the phosphor to the energy absorbed. Other important properties include the spectral region of maximum emission (which should match commonly-used photo detectors), optical absorption (where minimum self-absorption is desired), decay time of the emission (for some applications fast decay is desired), and the density. In general, superior scintillators exhibit high quantum efficiency, good linearity of the spectral emission with respect to incident energy, high density, fast decay time, and minimal self-absorption. Specific scintillator applications determine the choice of phosphor. For example, scintillators used for active and passive radiation detection require high density, and brightness, whereas scintillators used for x-ray computed tomography imaging also require fast decay time.

An exceptionally good scintillator is cerium-activated lutetium oxyorthosilicate, known as either LSO:Ce or Ce:LSO, and referred to herein as LSO:Ce. LSO:Ce is a crystalline solid that includes a host lattice of lutetium oxyorthosilicate ($Lu_2SiO_5$ abbreviated LSO) that is activated by a small amount of the rare-earth metal dopant cerium (Ce). Cerium is an excellent activator because both its ground and excited states lie within the band gap of about 6 eV of the host LSO lattice. LSO:Ce is very bright, i.e. it has a very high quantum efficiency. LSO:Ce also has a high density (7.4 gm/cm$^3$), a fast decay time (about 40 nanoseconds), a band emission maximum near 420 nanometers, and minimal self-absorption. Oxyorthosilicate scintillators, including LSO:Ce, have been described in the following reports and patents:

"Czochralski Growth of Rare-Earth Orthosilicates ($Ln_2SiO_5$)" by C. D. Brandle et al (Journal of Crystal Growth, vol. 79, p. 308 315, 1986) describes yttrium oxyorthosilicate (YSO) activated with Ce, Pr, Nd, Sm, Gd, Tb, Er, Tm, or Yb. Shmulovich et al. (Journal of the Electrochemical Society: Solid-State Science and Technology, vol. 135, no. 12, p. 31413151, 1988) describes single crystals of rare-earth activated YSO (prepared according to aforementioned C. D. Brandle et al.) which includes a green phosphor containing YSO activated with Tb and Gd, and a red phosphor containing YSO activated with Tb and Eu.

"Czochralski Growth of Rare Earth Oxyorthosilicate Single Crystals" by C. L. Melcher et al. (Journal of Crystal Growth, vol. 128, p. 10011005, 1993), describes the Czochralski preparation of single crystals of GSO:Ce, LSO:Ce, and YSO:Ce.

"Czochralski Growth and Characterization of $(Lu_1-xGd_x)_2 SiO_5$" by G. B. Loutts et al. (Journal of Crystal Growth, vol. 174, p. 331336, 1997) describes the preparation and properties of single crystals of cerium-activated oxyorthosilicates having a crystal lattice of lutetium and gadolinium.

U.S. Pat. No. 4,647,781 to K. Takagi et al. entitled "Gamma Ray Detector," which issued on Mar. 3, 1987 describes a cerium-activated oxyorthosilicate scintillator having the general formula $Gd_{2(1-x-y)}Ln_{2x}Ce_{2y}SiO_5$ wherein Ln is yttrium and/or lanthanum, wherein $0<=x<=0.5$, and wherein $0.001<=y<=0.1$.

U.S. Pat. No. 5,264,154 to S. Akiyama et al. entitled "Single Crystal Scintillator," which issued on Nov. 23, 1993, describes a single crystal cerium-activated oxyorthosilicate scintillator having the general formula $Gd_{2-(x+y)}Ln_xCe_ySiO_5$ wherein Ln is Sc, Tb, Lu, Dy, Ho, Er, Tm, or Yb, wherein $0.03<=x<=1.9$, and wherein $0.001<=y<=0.2$.

U.S. Pat. No. 6,689,298 to Kenneth J. McClellan et al. entitled "Crystalline Rare-Earth Activated Oxyorthosilicate Phosphor," which issued on Feb. 10, 2004, describes a variety of single crystal phosphors such as lutetium yttrium phosphor (host lattice LYSO), lutetium gadolinium phosphor (host lattice LGSO), and gadolinium yttrium phosphor (host lattice GYSO) that have been doped with rare earth dopants Sm, Tb, Tm, Eu, Yb, and Pr.

U.S. Pat. No. 6,323,489 to K. McClellan entitled "Single Crystal Scintillator," which issued on Nov. 27, 2001, describes a single crystal, cerium activated oxyorthosilicate scintillator having the general formula $Lu_{(2-x-z)}Y_xCe_zSiO_5$, wherein $0.05<=x<=1.95$ and $0.001<=z<=0.02$. The host lattice of this material is referred to herein as LYSO.

U.S. Pat. No. 4,958,080 to C. L. Melcher entitled "Lutetium Orthosilicate Single Crystal Scintillator Detector," which issued on Sep. 18, 1990, describes an x-ray detector employing a transparent, single crystal of cerium-activated lutetium oxyorthosilicate (LSO:Ce).

An activation detector performs particle detection by causing incoming neutrons to collide with nuclei of a detector target material, which causes some form of nuclear reaction, making the chemical element of the target temporarily radioactive. The radioactive decay results in the emission of secondary detected radiation, usually in the form of beta particles or gamma rays, each with a characteristic and well-known half-life. The number of detected secondary radiations is proportional to the flux of the neutron beam. One of the key advantages of activation detectors over other forms of neutron detectors is the predictable time delay response between the initial arrival of the neutron and the subsequent generation of secondary radiation such as gamma rays. This time delay response enables extraneous influences (particularly electromagnetic noise and neutron-induced prompt gamma rays emitted by surrounding materials) to be eliminated. In one embodiment of the invention, the activation detector is inserted into the neutron field, such as into the core of a nuclear reactor for a fixed interval in a first step, followed by removing the yittrium-containing material to a remote/shielded location where the activity of the material is measured. This method may be used to determine the distribution of power density within a nuclear reactor core.

Neutron particles have a kinetic energy level which is measured in the units eV (electron volts), and a flux (number of particles per unit area per unit time). In the present invention, a 'fast-neutron' which is to be detected is defined to be a neutron with an energy level above the gamma ray generation threshold of 908.960 keV, referenced hereafter simply as 1 MeV. Yttrium as a target material has the property of generating a mono-energetic secondary radiation in the form of a 908.960 keV gamma ray. The mono-energetic nature of the secondary radiation enables the detector to measure absolute neutron flux without reference to an external standard. As an additional advantage, the 908.960 keV gamma ray is not accompanied by other particles such as alpha or beta particles. This has particular detector advantages, as prior art detectors are unable to discern the detection of causal particles associated with particular events from background radiation, and often require a coincidence detector to detect the simultaneous emission of a variety of particle types to distinguish a causal radiation event from random background noise and background particle emission.

In one embodiment of the invention, the yttrium fast-neutron detector counts the number of 908.960 keV gamma rays emitted per unit time to determine the flux of incoming fast-neutrons. The use of fixed energy gamma rays which require an incoming threshold neutron energy level eliminates the threshold problem associated with continuous-energy secondary radiations (such as beta particles) where there is the unavoidable problem of determining what fraction of events fall below the detection threshold. The threshold problem arises because most activation detectors (e.g. indium, silver or rhodium) are based on detection of beta-particles. The beta-particle spectrum is a broad "hump" from zero energy up to an end-point energy. Every detector has some noise, so a threshold level must be set to try and distinguish beta-particle-pulses from noise-pulses. The noise floor calibration is performed with no source present, during which time the threshold level is increased until the noise count rate becomes a low level background count rate. Because the electronic detection circuit usually has a varying amount of gain, the actual amount of energy associated with the threshold level is difficult to determine, and it is likely to drift with time as the detector ages. Additionally, there are no sharp peaks in the beta spectra to help with energy calibration.

Prior art activation detectors are subject to drift in electronic gain and the characteristics of the detector, causing the effective threshold level of detection to drift with time, thereby making periodic re-calibration of the detector necessary. The use of a yttrium target, which responds only to incoming particles with an energy level greater than 1 MeV provides for a less expensive and more accurate neutron detector that is intrinsically immune to such threshold drift.

Another useful property of the invention is that the detector is completely insensitive to low energy neutrons, whereas detectors which use targets such as indium, rhodium and silver are very sensitive to low energy neutrons. This is advantageous in situations where it is desired to measure neutrons from deuterium-deuterium (DD) fusion reactions on the order of 2.5 MeV without interference from lower energy neutrons scattered by surrounding materials. It will also be advantageous for measuring the power density within the core of fast-neutron generation-IV reactors including the Sodium-cooled Fast Reactor, Lead-cooled Fast Reactor, and Molten-Salt Reactor System. Compared with other candidate target materials, yttrium (in metallic or ceramic form) is stable and non-toxic (unlike beryllium or arsenic), and the cost of yttrium is presently favorable (unlike that of silver, rhodium or indium), and the de-excitation of yttrium is characterized by a single half-life (unlike for silver or indium). For the detector to unambiguously measure the absolute neutron flux, it is very important that the secondary detected radiation be mono-energetic, a condition which is satisfied for yttrium and arsenic, but is not satisfied for alternative materials such as silver, rhodium, indium or beryllium. Although arsenic also emits a mono-energetic gamma ray, it is less desirable as a fast-neutron target material because of its high toxicity. Also the metastable state, $^{75m}As$, has a half-life of only 17.6 milli-seconds, which necessitates a very short delay (of a few milli-seconds) between the neutron pulse and the detection of the emitted gamma rays. In many cases this short (milli-seconds) delay is not sufficient to discriminate against electronic noise and gamma rays from surrounding materials associated with the neutron pulse. Moreover the emitted gamma rays, of energy 279 keV are closer in energy to the majority of background gamma rays, making them more difficult to distinguish from background than the higher energy 908.960 keV gamma rays from $^{89m}Y$.

The present invention relies on the detection of 908.960 keV gamma-rays generated from the de-excitation of $^{89m}Y$ and coupled to a scintillator which generates an optical response that is coupled to a photomultiplier tube. For efficient operation of this detector the scintillator crystal should have a high probability of fully absorbing the impinging 908.960 keV gamma rays, so that a large fraction of the counts are concentrated in the full-energy peak (or photo peak) of the gamma-ray energy spectrum. Hence the scintillator crystal should be a good absorber of gamma-rays, and this requires that the crystal should contain high-atomic-number constituents. Some suitable scintillator crystals are: BGO (containing bismuth, Z=83), LYSO (containing lutetium, Z=71), and CdWO4 (containing tungsten, Z=74).

FIG. 1 shows a first embodiment 100 of the invention where the yttrium target 102 in the form of highly pure yttrium metal such as greater than 99% purity, or alternatively yttria ceramic such as $Y_2O_3$, which target 102 is a separate structure from the scintillation crystal 112. The yttrium target 102 is sufficiently thick to create a nucleic collision with incoming neutron 108, causing the temporary nuclear radio-activity resulting in emitted gamma ray 104 which excites a photonic response in scintillator 112, the photonic response coupled to the surface of photomultiplier tube (PMT) 106 which detects the photons and converts the response to an electrical signal (not shown). The yttrium target 102 has a thickness T1 110 in the direction of fast-neutron trajectory of approximately 25-30 mm, and can be separated from the scintillator 112, or can be in adjacent contact as shown. The values given for best mode target thickness are examples, and may vary from less than 1/10th these values to 10× these values, and are optimized according to operational or experimental parameters, with thickness range T1 110 including the range 2 mm to 300 mm. It is experimentally observed that a yttrium target thickness greater than 30 mm results in attenuation of both incident neutrons and emitted 908.960 keV gamma rays, and yttrium targets less than 30 mm have reduced gamma ray yield since incoming neutrons have a lower probability of striking a yttrium nucleus and generating an inelastic collision. In one embodiment of the invention, the scintillator 112 is a scintillator crystal such as BGO, and is in close proximity to, but completely distinct from, the yttrium target containing part 102, which allows for the movement of the yttrium target 102 from a neutron loading location where a sample is to be taken to a shielded gamma ray measurement location, where the number of gamma rays may be counted. The more compact the yttrium target 102, the higher the neutron detection efficiency, and the inventors believe that yttrium metal has the greatest neutron detection efficiency. Alternatively, using a target 102 of ceramic yittria ($Y_2O_3$) results in a lower detection efficiency than yttrium metal (due to the lower target density), but in certain applications the chemical stability, low thermal conductivity and high melting point (2410° C.) of yttria ceramic would be advantageous. An example of one such application is measuring the power profile of a nuclear reactor core. For this embodiment of the invention the $Y_2O_3$ is not acting as a scintillator but rather contains the yttrium to be activated by fast-neutrons, which subsequently emit 908.960 keV gamma-rays detected by scintillator 112.

Figure 2:
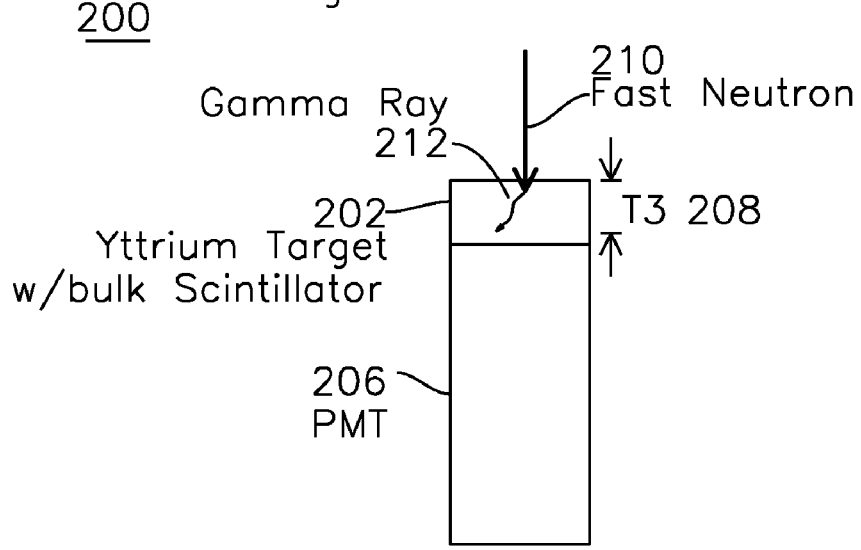
FIG. 2 is a section view diagram for a fast-neutron detector with an integrated target and scintillator.

FIG. 2 shows a second embodiment of the invention in which the target 202 yttrium is a constituent element within the scintillation crystal (such as LYSO, YAP:Ce, YAG:Ce, YSO:Ce or GYSO:Ce described below). Hence in this embodiment of the invention the crystal fulfills the functions of both yttrium-containing target and scintillator, and will be referred to here as the scintillator-target. A neutron 210 striking the scintillator-target 202 generates a gamma ray 212 which actuates the scintillator-target crystal 202, and photons emitted by scintillator-target 202 are captured by the photomultiplier tube 206, which generates an electrical response, as described for FIG. 1. Scintillator-target thickness T3 208 can be in the range 2 mm to 300 mm, with a preferred thickness in excess of 60 mm, since attenuation of the gamma rays is no longer a detector sensitivity issue in the scintillator-target 202 structure. The yttrium component of target 202 may include a scintillator and yttrium composite which has a minimum optical attenuation such that the gamma rays which excite a scintillator photonic response in the bulk of the target 202 are able to couple photons sufficient to generate a photomultiplier 206 response. The selection of thickness T3 is made based on a maximum yield of photonic response at the photomultiplier tube 206, where a reduced thickness T3 reduces the scintillator optical attenuation from a photonic response site to the PMT 206, but at the expense of decreased probability of a neutron/target interaction through the thickness T3. Target 202 can be a yttrium-containing scintillator such as any of the following: Yttrium Aluminum Perovskite doped with Cerium, also known as YAP:Ce; Yttrium Aluminum Garnet doped with Cerium, also known as YAG:Ce; Lutetium-Yttrium Orthosilicate doped with Cerium, known as LYSO:Ce; Yttrium Oxyorthosilicate doped with Cerium, known as YSO:Ce; and Gadolinium Yttrium Oxyorthosilicate doped with Cerium, known as GYSO:Ce. In a related embodiment of the invention, yttrium oxide ($Y_2O_3$) powder is compacted into a ceramic solid (by, for example, sintering) with another scintillator powder having high gamma ray absorption such as one or more of: BGO, lead tungstate ($PbWO_4$) or cadmium tungstate ($CdWO_4$). By itself, yttrium oxide would not absorb the 908.960 keV gamma rays very well as the atomic number for yttrium (Y) is only Z=39. Since the photoelectric cross-section increases approximately as $Z^5$, scintillators containing W (Z=74), Pb (Z=82), or Bi (Z=83) would improve gamma ray absorption and increase the conversion yield for gamma ray to optical energy applied to the photomultiplier tube. This particular embodiment of the invention has the advantage of mixing the yttrium (in the form of transparent $Y_2O_3$) with another high-Z scintillator within a transparent ceramic matrix. In general, the more transparent the ceramic scintillator, the greater the photonic sensitivity of the detector. Additionally, the cost of the detector would be greatly reduced as the powdered scintillator will be less expensive than a single-crystal scintillator. As a tradeoff against reduced cost, the sensitivity for this ceramic scintillator will be significantly less than a single crystal scintillator due to scattering and absorption of scintillator photonic response in addition to energy deposition in any matrix material which does not produce scintillation photonic response.

Figure 3:
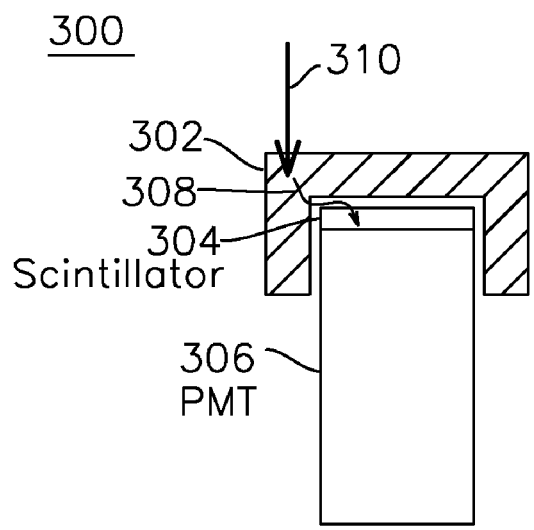
FIG. 3 is a section view diagram of a fast-neutron detector with a cup target.

FIG. 3 shows another embodiment of the invention which increases the detector sensitivity by encapsulating the scintillator 304 with a yttrium cup 302 which surrounds the photomultiplier 306 having a preferred thickness of 30 mm, or optionally having a thickness in the range from 2 mm to 300 mm. In this embodiment, incoming neutrons encounter the yttrium cup 302 which may have a scintillator radius which is slightly greater than the photomultiplier radius and generate a gamma ray response which includes the regions such as a neutron 310 collision site beyond the radial extent of the active surface of the photomultiplier tube 306 and thereby provide for an improved included angle of sensitivity to incoming neutrons with respect to the central axis of the photomultiplier. Resulting gamma rays such as 308 from a neutron 310 to yttrium target 302 collision are directed to the scintillator 304 and generate a photomultiplier tube 306 response. As described previously, the target 308 may be yttrium metal of purity greater than 99% for maximum gamma ray yield, and with a target thickness of approximately 30 mm, or in the range 2 mm to 300 mm, as described previously.

Figure 4:
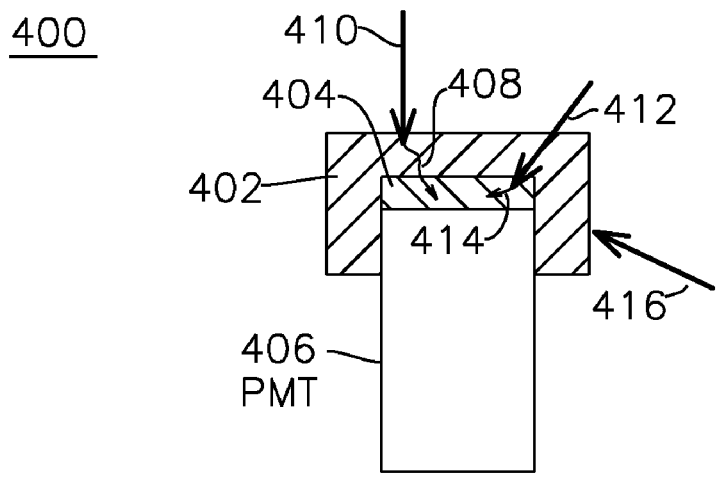
FIG. 4 is a section view diagram for a fast-neutron detector with a cup target and integrated scintillator.

FIG. 4 shows another embodiment of the detector, where a yttrium cup 402 surrounds a scintillator/yttrium target mixture 404. Neutrons 410 which strike the yttrium cup 402 generate gamma rays, some of which excite scintillating target 404 which contains a mixture of yttrium and scintillator crystal such as LYSO. Gamma ray 408 generated from neutron 410 collisions with pure yttrium in cup 402 generate a scintillation response from the scintillation material of target 404, which is coupled to photo multiplier tube 406, and neutron 412 which strikes yttrium nuclei of the scintillator/yttrium target 404 generates gamma ray 414 which excites the scintillation material of target 404 and is similarly coupled to photomultiplier tube 406. The structure of the cup 302 of FIGS. 3 and 402 of FIG. 4 provides a larger included angle of response for the generation of gamma rays which strike the scintillator, as can be seen from the incoming neutrons 410, 412, 416.

In another embodiment of the invention, a detector as described in FIG. 1, 2, 3, or 4 measures neutron density by converting neutrons greater than 1 MeV to gamma rays of 908.960 keV, which are then converted to optical energy by a scintillator and generating an optical response count using a photomultiplier tube, thereby providing the ability to determine the absolute flux of fast-neutrons, the detector not responding to neutrons below the 1 MeV energy level, further providing an absolute neutron flux measurement without the need for calibration or reference to an external standard.

In another embodiment of the invention providing improved fast-neutron sensitivity, the yttrium is present within the scintillator crystal in addition to a comparatively thick external layer of yttrium metal which surrounds the scintillator.

In another embodiment directed to a method of measuring the neutron density profile of a reactor core, high melting point ceramic yttria ($Y_2O_3$) is inserted, removed, and characterized by placing it adjacent to a gamma ray scintillator and photomultiplier tube to take a measurement during a decay interval formed by one or more of the 15.7s gamma ray half life intervals, such as was described for FIG. 1.

One of the advantages of the present invention is the suitability for use in pulsed fusion applications such as inertial confinement fusion, where the neutron load is instantaneous, making the gamma ray half-life of 15.7 seconds well suited for pulsed fusion applications.

Figures 5, 6:
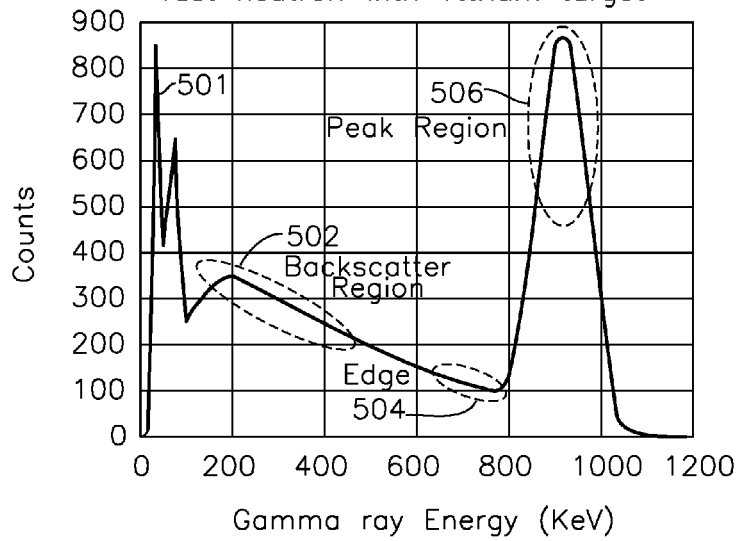
FIG. 5 is a plot of photomultiplier pulse count versus gamma ray energy for a neutron colliding with the yttrium target.
FIG. 6 is a table of energy levels for various energy states of the $^{89}Y$ nucleus.

FIG. 5 shows the gamma-ray energy spectrum 501 obtained with the yttrium fast-neutron activation detector of FIG. 1, 2, 3, or 4. The relevant nuclear reaction for the neutrons interacting with the yttrium target is $^{89}Y(n,n')^{89m}Y$. The inelastic scattering of fast-neutrons populates the meta-stable nuclear excited state $^{89m}Y$ which has a half-life of 15.7 s and de-excites to the ground state with the emission of the 908.960 keV gamma-ray. A BGO scintillation detector placed in close proximity to a slab of yttrium metal enables these gamma-rays to be efficiently measured and counted. The threshold energy for neutron detection is above 1 MeV, and in the present embodiments, this threshold results in the exclusive counting of the 908.960 keV photo peak of the gamma-ray spectrum, making the detector insensitive to drift in photomultiplier or electronic gain. Region 502 of response curve 501 is commonly referred to as the backscatter peak. Here it is due to the Compton scattering of 908.960 keV gamma-rays (emitted from the yttrium) by any material other than the scintillator. The backscatter region 502 diminishes in count to the Compton edge region 504. The Compton edge corresponds to 908.960 keV gamma rays (emitted from the yttrium), Compton scattering within the scintillator, and the scattered gamma ray escapes from the scintillator. Here the Compton edge corresponds to an energy of about 709 keV.

Figure 7:
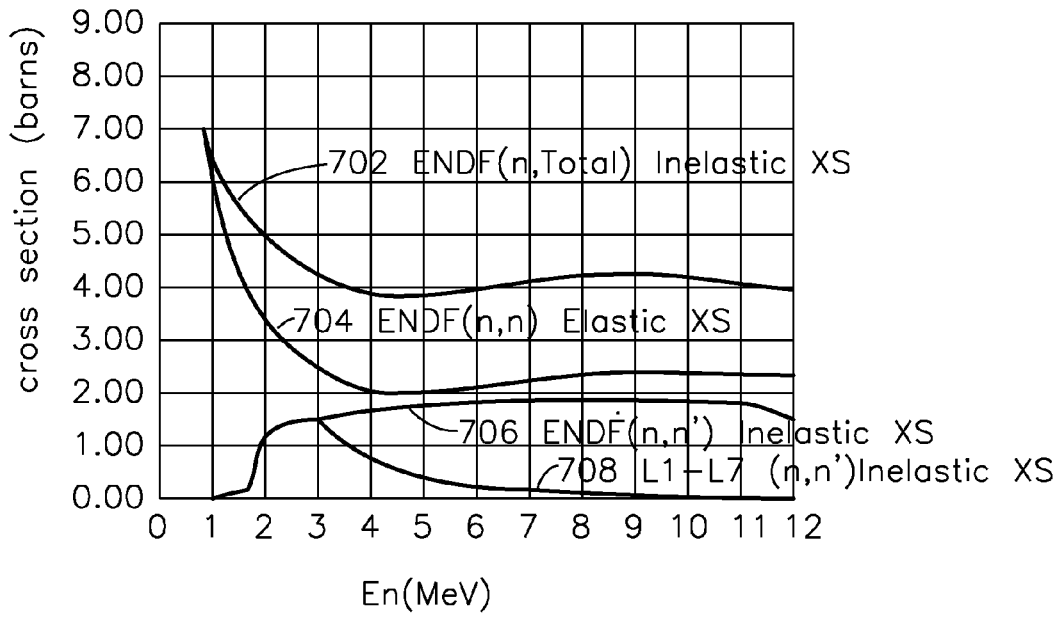
FIG. 7 is a plot of reaction probability versus neutron energy for various reaction types.

FIG. 6 shows the various excitation states for $^{89}$Y, the elemental form of natural yttrium as used in the present detector targets in either pure or target mixture of yttria powder combined with a scintillator. The low-lying excitation states 602 of $^{89}$Y are shown, and the relevant cross-sections for the reaction $^{89}$Y(n,n')$^{89m}$Y (as a function of neutron energy) are shown in FIG. 7. As can be seen from this Figure, the $^{89m}$Y metastable level can also be result from excitations to more highly excited levels. For example, about 68% of de-excitations from the 2222.43 keV level go to the $^{89m}$Y metastable level.

FIG. 7 shows simulations of the cross-section (XS) area for various forms of collision, using the well known MCNP software from "MCNP—A General Monte Carlo N-Particle Transport Code—Version 4C," by J.F. Briesmeister, Ed. LA-13709-M, Los Alamos National Laboratory (March, 2000). The simulations use data from the Evaluated Nuclear Data File (ENDF) available from National Nuclear Data Center, Brookhaven National Laboratory. Curve 702 shows ENDF (n, Total XS), which is the sum of curves 704 and 706, which represent ENDF (n,n) elastic XS, and ENDF (n,n') inelastic XS, respectively. Curve 708 is the sum of the desired excited energy levels L1-L7 (n,n') inelastic XS. The labels L1 to L7 represent the first seven excited levels of the $^{89}$Y nucleus. Curve 702 shows the total cross sectional area for 2.45 MeV neutrons is 4.4 barns, for the sum of elastic and inelastic interactions. Elastic scattering is more probable than inelastic in particular for lower neutron energies. At energies above 3 MeV the L1-L7 (n,n') inelastic cross-section decreases, as can be seen from curve 708.

Figure 8:
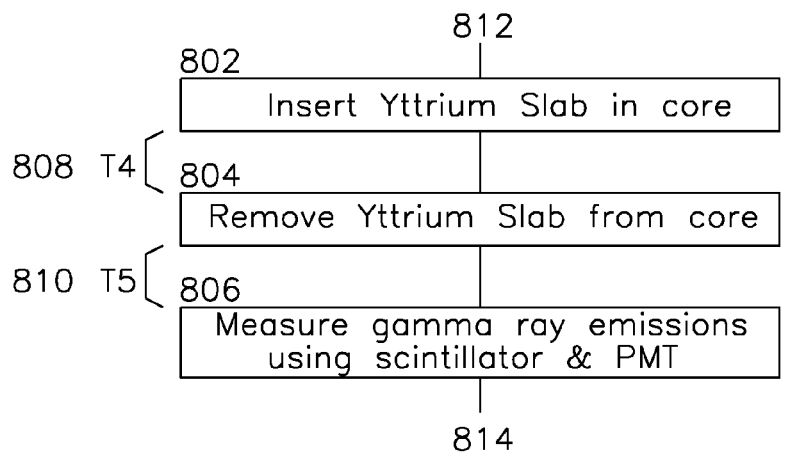
FIG. 8 shows a flowchart for a measurement process for profiling neutron density in a continuous neutron source such as a reactor core.

FIG. 8 shows a process for profiling the fast-neutron density of a reactor core or other continuous source of fast-neutrons. The process starts at 812 with the insertion 802 of a Yttrium slab into the core to be measured, after which the slab is removed 804 from the core region to be profiled and placed adjacent to a scintillator and photomultiplier in step 806 for measurement of gamma ray energy. As the yttrium slab has approximately 15.7s half life for gamma ray generation, the removal time T5 810 and time spent making measurements 806 may be used to compute a neutron density which compensates for the half life durations spent in transport from the core to the measurement system. For this measurement process, the yttrium target 102 of FIG. 1 may be transported to the reactor core and placed where the neutron fluence (neutron dose per unit area) is to be measured until the yttrium target reaches equilibrium. For this measurement, equilibrium may be defined as the point of time after insertion where the rate of de-excitations is very nearly equal to the rate of excitations (due to inelastic neutron scatterings). In one embodiment of the process shown in FIG. 8, equilibrium occurs when T4 is 10 times longer than the half-life of 15.7 seconds, or 157 seconds or more). After exposure to the region of the core to be profiled, the yttrium target is placed adjacent to scintillator 112 and photomultiplier 106, compensating for exponential decay in gamma ray radiation during the transport interval T5 810 when the target 102 is moved from reactor core to scintillator 112 and photomultiplier 106.

One application for the present invention is the measurement of fast-neutron flux in pulsed fusion applications, such as inertial confinement fusion reactors, such as those in use at the National Ignition Facility (Lawrence Livermore Lab, USA), the Laser MegaJoule Facility (France), and GEKKO XII (Osaka, Japan).

Another application for the present invention is the measurement of fast-neutron flux in Spallation Neutron Sources, such as the facilities of: SNS Facility (Oak Ridge Lab, USA), ISIS (Daresbury, UK), European Spallation Source (ESS) (UK) and J-PARC (Japan).

Another application for the present invention is power density profiling within the fast-neutron reactor core, which is applicable to the fourth Generation nuclear reactors presently being developed, including the Sodium-cooled Fast Reactor, Lead-cooled Fast Reactor, and Molten-Salt Reactor System.

Another application for the present invention is the detection of illicit nuclear material, including neutron monitoring equipment for use at cargo ports and airports.

The embodiments provided herein are intended to aid in understanding the specific examples presented, and do not limit the scope of the invention, as set forth in the claims below.

We claim:

1. A fast-neutron activation detector having:
    a yttrium target exposed to a source of neutrons during an exposure interval, said yttrium target generating instantaneous gamma ray radiation upon inelastic collisions of said fast-neutrons with said yttrium target and thereafter generating activation gamma ray radiation during a measurement interval which follows said exposure interval;
    a scintillator responsive to gamma rays and generating a photonic response from said gamma rays, said photonic response being measured during said measurement interval following said exposure interval;
    a photomultiplier responsive to said scintillator photonic response and generating a count during said measurement interval, said count converted to a neutron flux measurement.

2. The fast-neutron detector of claim 1 where said yttrium target is yttrium metal having a purity greater than 99%.

3. The fast-neutron detector of claim 1 where said yttrium target has a thickness in the range of 2 mm to 300 mm.

4. The fast-neutron detector of claim 1 where said scintillator contains at least one of LYSO, YAP(Ce), YAG(Ce), BGO (containing bismuth, Z=83), LYSO (containing lutetium, Z=71), or CdWO4 (containing tungsten, Z=74).

5. The fast-neutron detector of claim 1 where said gamma rays generated by said inelastic collisions includes an energy level of substantially 908.96 keV and said measurement interval is within a decay time spanning a plurality of yttrium-89 half-lives, each said yttrium-89 half life being substantially 15.663 seconds.

6. The fast-neutron detector of claim 1 where said yttrium target and said scintillator form a homogenous structure having a mixture of yttrium powder and a scintillator, said homogenous structure having an optical transparency sufficient to allow gamma rays generated within said homogeneous structure to interact with said scintillator to form a photonic response which is coupled to said photomultiplier sufficient to generate a photomultiplier response.

7. A fast-neutron detector having:
    a photomultiplier tube having an active surface responsive to photonic energy and thereby generating an electrical signal;
    a scintillator coupled to said photomultiplier active surface, said scintillator responsive to gamma rays;

a yttrium cup having an inner surface which encloses said photomultiplier tube active surface and also said scintillator, said yttrium cup having an outer surface opposite said photomultiplier active surface and exposed to a source of neutrons;

whereby said neutrons having an energy level greater than 908.96 keV during an excitation interval generate gamma radiation during a measurement interval which occurs after the excitation interval, said gamma radiation being converted by said scintillator to photonic energy coupled to said photomultiplier tube active surface, and said electrical signal is used to form a radiation measurement during said measurement interval.

8. The fast-neutron detector of claim 7 where said yttrium cup is metallic yttrium with a purity greater than 99%.

9. The fast-neutron detector of claim 7 where said scintillator is at least one of LYSO, YAP(Ce), YAG(Ce), BGO (containing bismuth, Z=83), LYSO (containing lutetium, Z=71), or CdWO4 (containing tungsten, Z=74).

10. The fast-neutron detector of claim 7 where said yttrium cup contains yttrium-89.

11. The fast-neutron detector of claim 10 where at least one of said yttrium powder or said scintillator powder formed into a solid ceramic.

12. The fast-neutron detector of claim 11 where said solid ceramic is formed by sintering.

13. A method for profiling the neutron density of a continuous source of neutrons, the method having:
- a first step of placing a yttrium target into a region to be measured;
- a second step of removing said yttrium target from said neutron source and placing said yttrium target adjacent to a scintillator coupled to a photomultiplier tube within a time interval;
- a third step of counting a number of photomultiplier tube responses resulting from gamma rays released by said yttrium target and generating a photonic response from said scintillator;
- a fourth step of computing a fast-neutron flux based on a number of photonic counts and compensated by said time interval in combination with a gamma ray half life of substantially 15.6 seconds.

14. The method of claim 13 where said scintillator contains at least one of LYSO, YAP(Ce), YAG(Ce), BGO (containing bismuth, Z=83), LYSO (containing lutetium, Z=71), or CdWO4 (containing tungsten, Z=74).

15. The method of claim 13 where said yttrium target contains ceramic yttria ($Y_2O_3$).

16. The method of claim 15 where said ceramic yttria is formed by a sintering process.

* * * * *